United States Patent Office 3,586,598
Patented June 22, 1971

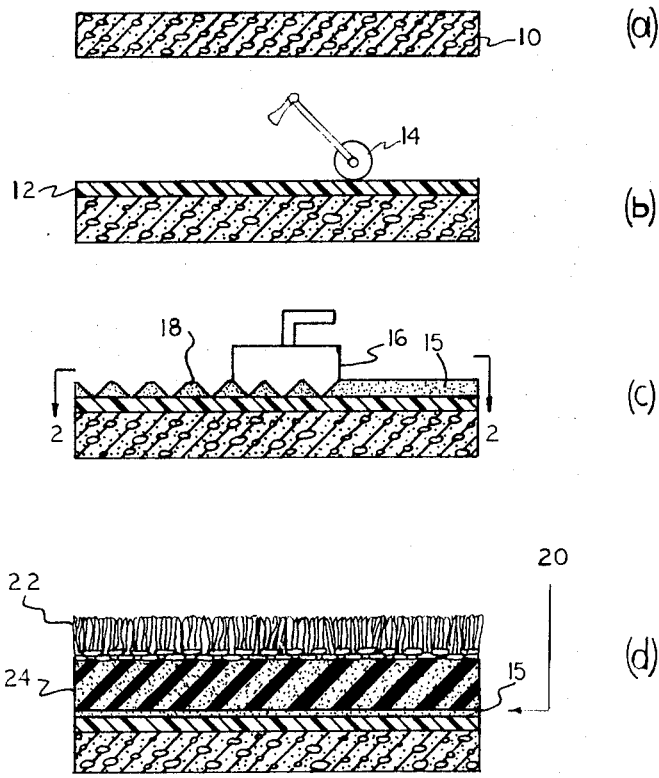
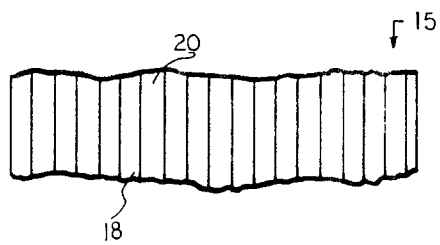

3,586,598
CARPET FLOOR COVERING AND METHOD
Paul H. Beemer, Whittier, Calif., assignor to W. W. Henry Company, Huntington Park, Calif.
Filed Nov. 1, 1968, Ser. No. 772,589
Int. Cl. B32b 3/26; D03d 27/00
U.S. Cl. 161—160                                    14 Claims

ABSTRACT OF THE DISCLOSURE

A manually releasable assembly of adhesively-secured cushion-backed carpeting is disclosed. The substrate flooring if in a porous or rough condition is coated with a non-porous film former such as a sealer to form a smooth surface. After the sealer has dried, a controlled thickness layer of high-tear strength film-forming adhesive, such as one comprising natural latex, is applied to the floor. Before the adhesive film has dried, a section of low-tear strength cushion-backed carpeting is applied to the adhesive film. The film and attached carpeting can be parted from the smooth flooring surface solely by manual forces without tearing the cushion or leaving any of the cushion or the adhesive film on the floor.

BACKGROUND OF THE INVENTION

(1) Field of the invention

The present invention relates to the covering of floors, and more particularly, to a method of adhering cellular elastomer cushion-backed carpet to floors.

(2) Description of the prior art

Recently, there has been an increased use of carpeting as a floor covering in industrial and residential buildings. The usual carpet installation method involves the separate laying of a resilient pad which is overlaid with the carpeting. The carpeting is cut and seamed to fit wall to wall, and the perimeter is then mechanically secured at the edges with various mechanical fasteners such as tackless strips having rows of upstanding nails. The cut and seamed carpeting is then stretched over these nails. Such installations require many hours of labor by trained personnel to lay the tackless strip, lay the pad, and cut, seam and install the carpet.

There is available foam- or sponge-backed carpeting which eliminates the laying of a separate resilient pad. This type of carpeting has usually been bonded to a floor with adhesive. However, when it is desired to remove a worn or stained portion or, in fact, the complete carpet, the soft foam backing will rupture, leaving a mass of adhesive and foam backing on the floor.

OBJECTS AND SUMMARY OF THE INVENTION

It is therefore an object of the invention to provide an efficient and inexpensive technique for installing cushion-backed carpet.

Yet another object of the invention is to provide a method of installing cushion-backed carpeting without the aid of mechanical fasteners in a manner in which selected portions of the installed carpet can be quickly and cleanly removed.

These and other objects and many attendant advantages of the invention will become apparent as the description proceeds.

In accordance with the invention, a manually-releasable assembly of adhesively-secured carpet is provided by peelably adhering said carpet to a smooth flooring substrate. These characteristics are provided by preparing the flooring surface in a smooth, non-porous form by coating the substrate flooring, if necessary, with a non-porous film-former such as a sealer. After allowing the non-porous coating to dry, a layer of high-tear strength film-forming adhesive, such as natural rubber latex adhesive, is applied to the floor, preferably with a notched spreader to form ridges which control strength by controlling the thickness of the film. When the film is dried, it will have greater tear strength than the cushion layer and will reinforce it. Before the film has dried, a section of cushion-backed carpeting, preferably cut to fit the aera desired to be covered, is applied to the adhesive. Later, when it is desired to remove the carpeting, the high-tear strength film is grasped and the assembly will part and release from the smooth substrate by manual pressure alone without tearing the foam or leaving any of the foam cushion or adhesive film on the floor.

BRIEF DESCRIPTION OF THE DRAWINGS

The invention will now become better understood by reference to the following detailed description when considered in conjunction with the following drawings.

FIG. 1 is a schematic illustration of the steps involved in securing and removing foam-backed carpeting according to the invention; and FIG. 2 is an elevational view taken along the line 2—2 of FIG. 1(c).

Referring now to FIGS. 1 and 2, a floor surface such as concrete 10 is prepared by removing all foreign matter such as dirt, grease and the like. A film 12 of sealer is applied with an applicator 14 such as a paint brush, paint roller or smooth trowel. The film of sealer 12 is in turn coated with a continuous film of latex base adhesive 15 after the primer has dried. As shown in FIG. 1(c), it is preferred to apply the adhesive with a notched spreader 16 to form a film 15 having raised ridges 18.

Before the latex base adhesive film 15 has dried, a pre-trimmed and pre-cut section of carpet 20 having a pile area 22 and a sponge or foam backing 24 is properly positioned and pressed onto the adhesive film 15. The installation pressure flattens the ridges 18 of adhesive into an essentially even flat film. After the adhesive is completely dry, the installation is complete and placement of furniture and movement on the carpet can be permitted.

The adhesive film holds the carpet firmly to the floor, even in areas subjected to substantial foot traffic or wheel traffic. When it is desired to remove the carpet, a corner of the latex film is carefully peeled up from the floor using a sharp instrument if necessary and is grasped between the fingers and pulled firmly. The latex film 15 will cleanly separate from the smooth and non-porous sealer film 12. The tear strength of the latex film must be greater than the adhesive bond between the latex and the substrate which in turn must be sufficient to withstand traffic forces.

The sealer or primer can be of many different types. It is usually a solvent dispersed system of a resin that flows to a smooth and non-porous film as it dries. The resin should form a firm bond with the porous substrate and should dry to a smooth, non-tacky film to provide release characteristics with the latex film of the invention. Furthermore, the film should not in itself impair the attractiveness or usefulness of the floor surface. The adhesive bonding of the sealer to the substrate is greater than that of the latex film to the sealer. A suitable sealer for the purposes of the invention comprises a naphtha solution of a vinyl-toluene polymer. The resin is dissolved in an aliphatic solvent, such as naphtha, and is plasticized with a plasticizer oil. The following is an example of a suitable primer according to the invention.

DESCRIPTION OF THE PREFERRED EMBODIMENTS

Example I

Fifty pounds of vinyl-toluene polymer solids were dissolved in 93 pounds of naphtha to which was added ten pounds of a plasticizer oil. This primer will cover approximately 300 square feet per gallon. It is applied to the floor with a brush and is dry after approximately one-half hour. During this time, the carpet can be precut and trimmed to fit the requirements of the flooring space to be covered.

The preferred adhesive film of the invention is an uncured and unvulcanized latex film laid down from a water dispersion of natural rubber latex particles. It is particularly adapted for use in the carpet adhering method of the invention since it has a high degree of strength, toughness and elasticity. It forms films of superior strength, great cohesion and, therefore, higher tear strength than the adhesive strength to the smooth and non-porous flooring substrate. As discussed above, the thickness of the film should be adjusted to insure proper tear strength. This is provided by use of a notched trowel which applies the adhesive to the floor at the rate of about 10 to 15 yards per gallon. This thickness will provide the minimum tear strength sufficient to reinforce the foam against tearing on removal and sufficient cohesion to permit the film to peel away as a continuous unruptured film. Other advantages attendant in the use of water-dispersed latex are the absence of toxic and inflammable solvents, very high solids and the absence of any organic solvents which might be harmful to elastomer foam or sponge cushion carpet backing.

The natural rubber latex film of the invention is formed from an aqueous dispersion of rubber particles containing antioxidants, stabilizers and antibacterial agents. The latex is usually ammoniated to prevent bacterial attack. The latex may be in its normal concentration of 35 to 40% solids or preferably is concentrated to about 60% solids. Natural latex has a tendency to coagulate when subjected to frictional forces, and, therefore, coagulation stabilizers such as casein, glue, starch, soaps or gums or other colloids are preferably added. A preferred stabilizer comprises 2 to 5% by weight of solids of a 10 to 15% ammoniated casein solution. Various thickeners, such as Karaya gum, ammonium alginate, starch, or other gums, may be added as may be clay or other fillers to increase viscosity. The natural latex solids should predominate over the clay solids since clay fillers in an unvulcanized latex system tend to impair adhesion.

Antioxidants such as butyl zimate zinc dibutyldithiocarbamate) and Age Rite spar mono, di, and tri-styrenated phenols) are also added in small proportions, usually about 1 to 5% on the basis of the latex solids. An example of a latex system for use in accordance with the invention follows.

Example II

The following ingredients were mixed in the indicated proportions:

| | Lbs. |
|---|---|
| Water | 16 |
| Vanderbilt MacNamee clay (65.5% solids) | 75 |
| Ammonium caseinate (11.7%) | 30 |
| Natural ammoniated latex (61% solids) | 200 |
| Butyl zimate slurry (50%) | 3 |
| Age Rite spar emulsion (65%) | 5 |

The film is applied to the floor with the special notched applicator as discussed and within about one-half hour, it partially dries. While the latex film is in this condition, the pre-cut and trimmed carpet is pressed into place and is allowed to firmly bond the sponge or foam back to the latex film.

The carpeting can be of any type of synthetic or natural yarn and the pile may be in either looped, cut or twisted form. The latex film of the invention is compatible with cushioning foams or sponges of synthetic or natural origin which may be foamed polystyrene, polyurethane, natural latex or synthetic rubber foams or sponges.

The invention thus provides a technique for installing cushion-back carpeting that is convenient and economical and yet permits ready removal of carpet in the areas desired to be patched or replaced. The latex film of the invention holds the carpet firmly to the floor and does not permit release of the bond of the latex film to the smooth substrate except when an edge of the latex film is removed and utilized to peel the assembly of soft cushion-backed carpeting from the floor. The floor is then returned to an attractive smooth and non-porous condition suitable for reinstallation of carpet or use as is.

It is to be understood that only preferred embodiments of the invention have been illustrated and that numerous substitutions, alterations and modifications are all permissible without departing from the scope of the invention as defined in the following claims.

What is claimed is:

1. A floor covering assembly comprising in combination:
   a flooring member having a smooth and non-porous upper surface;
   a section of cellular, elastomer cushion-backed carpeting; and
   a continuous, self-cohesive, high tear strength, coherent film of adhesive, comprising uncured and unvulcanized natural rubber latex adherent to said backing and peelably adherent to said flooring surface, said film having a thickness sufficient to provide said film with greater tear strength than said cushion-backing and greater tear strength than the adhesive force between said flooring surface and said film and remaining coherent and unruptured when pulled to cleanly release from said surface without tearing said cushion-backing or leaving any of said cushion or adhesive film on the flooring surface.

2. In an assembly according to claim 1 further including a non-tacky film of smooth and non-porous sealer film on said flooring surface and adhesively secured to said flooring with an adhesive force greater than the adhesive force between said sealer film and said adhesive film.

3. A method of securing to a smooth and non-porous flooring surface a sheet of carpeting co-extensive with said surface having a layer of low tear strength, cellular, elastomer cushion-backing adherent to the rear surface thereof comprising the steps of:
   applying to said smooth and non-porous surface a continuous and coherent film of an adhesive composition comprising an uncured and unvulcanized aqueous dispersion of natural rubber latex particles, in a thickness to provide a film having a tear strength greater than the adhesive force between said film and said surface and a tear strength greater than the tear strength of said cushion-backing;
   laying the cushion-backed carpeting on said film before it is dry to firmly secure said backing to said film; and
   drying said film to form a high tear strength, cohesive film which has a thickness sufficient to reinforce said cushion-backing and a thickness sufficient to permit peeling said film cleanly away from said surface as a continuous, unruptured film without tearing said cushion-backing or leaving any of said cushion or adhesive film on the flooring surface when said film is gripped and pulled.

4. A method according to claim 3 in which said floor is rendered smooth and non-porous by applying a film of smooth and non-porous sealer to said floor before the application of said adhesive film.

5. A method according to claim 4 in which said sealer film is applied from a solution of resin in solvent and said solvent is evaporated to form a non-tacky sealer film before application of said adhesive.

6. A method according to claim 5 in which said resin is a vinyl-toluene polymer.

7. A method according to claim 3 in which selected portions of said carpet are removed from said floor surface by peeling said adhesive as a continuous, unruptured film from the smooth and non-porous surface.

8. A method according to claim 3 in which said film comprises stabilized natural rubber latex.

9. A method according to claim 8 in which said latex is an ammoniated natural rubber latex.

10. A method according to claim 9 in which said latex contains antioxidants selected from the group consisting of carbamates and phenols.

11. A method according to claim 10 in which said latex further contains a minor amount of a clay filler.

12. A method according to claim 11 in which the adhesive contains a natural ammoniated latex containing about 35 to about 60% latex solids, 2 to 5% by weight based on said solids of a coagulation stabilizer, 1 to 5% by weight of an anti-oxidant, and gum thickeners and clay filler solids in an amount less than said latex solids.

13. A method according to claim 12 in which the viscosity of the composition is sufficient to form upstanding ridges when applied to said flooring with a notched spreader.

14. A method according to claim 12 in which the adhesive composition comprises on a relative basis:

| Material: | Amounts, lbs. |
|---|---|
| Water | 16 |
| Clay (65.5 solids) | 75 |
| Ammonium caseinate (11.7 solids) | 30 |
| Natural ammoniated latex (61% solids) | 200 |
| Zinc dibutyldithiocarbamate (50% solids) | 3 |
| Styrenated phenol emulsion (65% solids) | 5 |

References Cited

UNITED STATES PATENTS

| 2,042,692 | 6/1936 | Wurzburg | 161—167X |
|---|---|---|---|
| 2,274,848 | 3/1942 | Pennell | 161—406X |

FOREIGN PATENTS

| 583,729 | 9/1959 | Canada | 161—67 |
|---|---|---|---|

ROBERT F. BURNETT, Primary Examiner

R. L. MAY, Assistant Examiner

U.S. Cl. X.R.

52—390; 156—71, 72; 161—67